US012110802B1

(12) United States Patent
Freeman et al.

(10) Patent No.: US 12,110,802 B1
(45) Date of Patent: Oct. 8, 2024

(54) FULL HOOP CERAMIC MATRIX COMPOSITE VANE ENDWALL INTEGRATION WITH TURBINE SHROUD RING AND MOUNTING THEREOF

(71) Applicant: Rolls-Royce Corporation, Indianapolis, IN (US)

(72) Inventors: Ted J. Freeman, Indianapolis, IN (US); David J. Thomas, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/132,355

(22) Filed: Apr. 7, 2023

(51) Int. Cl.
*F01D 25/24* (2006.01)
*F01D 9/04* (2006.01)

(52) U.S. Cl.
CPC ........... *F01D 25/246* (2013.01); *F01D 9/042* (2013.01); *F05D 2240/14* (2013.01); *F05D 2260/38* (2013.01)

(58) Field of Classification Search
CPC .... F01D 9/042; F01D 25/246; F05D 2240/14; F05D 2260/38
See application file for complete search history.

(56) References Cited

U.S. PATENT DOCUMENTS 5,078,576 A * 1/1992 Hayton ................. F01D 5/3084 415/189
6,340,285 B1 1/2002 Gonyou et al.
6,530,744 B2 3/2003 Liotta et al.
7,249,462 B2 * 7/2007 Aumont .................. F01D 9/044 60/753
7,798,775 B2 9/2010 Kammel et al.
8,092,163 B2 1/2012 Shapiro et al.
8,206,100 B2 6/2012 Schuler et al.
9,546,557 B2 1/2017 Grooms, III et al.
10,370,990 B2 8/2019 Reynolds et al.
10,370,992 B2 * 8/2019 Ponchak ............... F01D 11/005
10,370,994 B2 * 8/2019 Thomas ................ F01D 11/005
10,371,383 B2 8/2019 Reynolds et al.
10,378,373 B2 8/2019 Reynolds et al.
10,385,709 B2 8/2019 Reynolds et al.
10,450,897 B2 10/2019 Gallier et al.
10,822,973 B2 11/2020 Parvis et al.
10,961,857 B2 3/2021 Whittle et al.
11,073,039 B1 7/2021 Whittle et al.
11,143,402 B2 10/2021 Noe et al.
11,149,569 B2 10/2021 Reynolds et al.
11,149,575 B2 10/2021 Kern et al.
11,181,005 B2 11/2021 Zelesky et al.
11,268,394 B2 3/2022 Frey et al.
11,286,799 B2 3/2022 Shapiro et al.
11,306,617 B2 4/2022 Gallier et al.
11,384,651 B2 7/2022 Shapiro et al.
11,391,171 B2 7/2022 Reynolds et al.
(Continued)

*Primary Examiner* — J. Todd Newton
*Assistant Examiner* — Aye S Htay
(74) *Attorney, Agent, or Firm* — Barnes & Thornburg LLP

(57) ABSTRACT

A turbine section of a gas turbine engine includes a case, a plurality of flow path components, and a mounting system. The case extends circumferentially around a central axis of the gas turbine engine. The plurality of flow path components includes a turbine vane, a turbine blade, and a flow path ring. The mounting system is configured to couple the flow path ring to the case.

16 Claims, 3 Drawing Sheets

(56) References Cited

U.S. PATENT DOCUMENTS

| | | | | |
|---|---|---|---|---|
| 11,441,436 | B2 | 9/2022 | Frey et al. | |
| 2006/0005529 | A1* | 1/2006 | Penda | F01D 11/16 60/782 |
| 2014/0001285 | A1* | 1/2014 | Grooms, III | F01D 5/18 239/265.11 |
| 2014/0004293 | A1 | 1/2014 | Grooms, II et al. | |
| 2017/0044921 | A1* | 2/2017 | Vetters | F01D 11/12 |
| 2021/0017867 | A1* | 1/2021 | Whittle | F01D 9/041 |
| 2021/0231024 | A1* | 7/2021 | Whittle | F01D 11/08 |
| 2022/0390112 | A1 | 12/2022 | Ganiger et al. | |
| 2022/0390114 | A1 | 12/2022 | Ganiger et al. | |

* cited by examiner

FULL HOOP CERAMIC MATRIX COMPOSITE VANE ENDWALL INTEGRATION WITH TURBINE SHROUD RING AND MOUNTING THEREOF

FIELD OF THE DISCLOSURE

The present disclosure relates generally to gas turbine engines, and more specifically to turbine sections for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over flow path components of the turbine, such as airfoils included in stationary vanes, rotating blades, and static shrouds arranged around the rotating blades. The interaction of combustion products with these components in the turbine heats the components to temperatures that require the components to be made from high-temperature resistant materials and/or to be actively cooled by supplying relatively cool air to the vanes and blades. To this end, incorporating composite materials adapted to withstand very high temperatures in the turbine may be desired. Design and manufacture of the flow path components of the turbine from composite materials presents challenges due to the geometry and strength limitations of composite materials.

SUMMARY

The present disclosure may comprise one or more of the following features and combinations thereof.

A turbine section for use with a gas turbine engine may include a case, a plurality of flow path components, and a mounting system. The case may be made of metallic materials. The case may extend circumferentially around a central axis of the gas turbine engine.

In some embodiments, the plurality of flow path components may be arranged to define a primary gas path of the turbine section. The plurality of flow path components may include a turbine vane, a turbine blade, and a flow path ring. The turbine blade may be located axially aft of the turbine vane and configured to rotate about the central axis of the gas turbine engine.

In some embodiments, the flow path ring may be made of ceramic matrix composite materials. The flow path ring may extend circumferentially about the central axis of the gas turbine engine to define an outer boundary of the primary gas path of the gas turbine engine. The flow path ring may extend axially between a forward end and an aft end spaced apart axially from the forward end. The forward end may be located axially forward of the turbine vane. The aft end may be located axially aft of the turbine blade.

In some embodiments, the mounting system may be configured to couple the flow path ring to the case to support the flow path ring radially relative to the central axis of the gas turbine engine. The mounting system may include a plurality of spring mounts arranged to extend between the flow path ring and the case and configured to elastically deform.

In some embodiments, the turbine vane and the flow path ring may be free for radial movement relative to each other to accommodate different rates of thermal expansion experienced by the ceramic matrix composite materials of the flow path ring and the metallic materials of the case.

In some embodiments, the turbine section may further comprise a seal. The seal may be coupled to the flow path ring for movement therewith. The seal may be located at an interface between the turbine vane and the flow path ring to seal therebetween.

In some embodiments, the plurality of spring mounts may be spaced apart axially between the forward end of the flow path ring and the aft end of the flow path ring. The plurality of spring mounts may be spaced apart circumferentially about the central axis of the gas turbine engine.

In some embodiments, the plurality of spring mounts may include a first spring mount and a second spring mount axially spaced apart from the first spring mount. The first spring mount may be located near the forward end of the flow path ring. The second spring mount may be located near the aft end of the flow path ring. The turbine vane may be axially located between the first spring mount and the second spring mount.

In some embodiments, the mounting system may further include a vane mount. The vane mount may be configured to engage the turbine vane axially between the first spring mount and the second spring mount.

In some embodiments, the vane mount may include a pair of mount hangers and a vane support. The mount hangers may extend radially inward from the case toward the flow path ring.

In some embodiments, the vane support may have a carrier formed with a pair of carrier hooks and a support spar. The pair of carrier hooks may extend radially outward toward the case and mate with the pair of mount hangers to couple the carrier to the case. The support spar may extend radially inward from the carrier through the flow path ring and into the turbine vane.

In some embodiments, the turbine section may further comprise a seal. The seal may be located at an interface between the turbine vane and the flow path ring to seal therebetween. The forward end of the flow path ring may be located adjacent to a combustor liner included in the gas turbine engine.

According to another aspect of the present disclosure, a turbine section for use with a gas turbine engine may include a case, a plurality of flow path components, and a mounting system. The case may be made of metallic materials. The case may extend circumferentially around a central axis of the gas turbine engine.

In some embodiments, the plurality of flow path components may include a turbine vane, a turbine blade, and a flow path ring. The turbine blade may be located axially aft of the turbine vane. The turbine blade may be configured to rotate about the central axis of the gas turbine engine. The flow path ring may be made of ceramic matrix composite materials. The flow path ring may extend circumferentially about the central axis of the gas turbine engine to define an outer boundary of a primary gas path of the gas turbine engine. The flow path ring may extend axially between the turbine vane and the turbine blade.

In some embodiments, the mounting system may be configured to couple the flow path ring to the case to support the flow path ring radially relative to the central axis of the gas turbine engine. The mounting system may include a plurality of mounts arranged to extend between the flow path ring and the case. The plurality of mounts may be configured to elastically deform to maintain a radial position of the flow path ring relative to the case.

In some embodiments, the turbine vane and the flow path ring may be free for radial movement relative to each other to accommodate different rates of thermal expansion experienced by the ceramic matrix composite materials of the flow path ring and the metallic materials of the case.

In some embodiments, the turbine section may further include a seal. The seal may be coupled to the flow path ring for movement therewith. The seal may be located at an interface between the turbine vane and the flow path ring to seal therebetween.

In some embodiments, the plurality of mounts may be spring mounts. The plurality of mounts may be spaced apart axially between a forward end of the flow path ring and an aft end of the flow path ring spaced apart axially from the forward end.

In some embodiments, the plurality of mounts may include a first spring mount located near the forward end of the flow path ring and a second spring mount axially spaced apart from the first spring mount and located near the aft end of the flow path ring. The turbine vane may be axially located between the first spring mount and the second spring mount.

In some embodiments, the plurality of mounts may be spaced apart circumferentially about the central axis of the gas turbine engine. The mounting system may further include a vane mount. The vane mount may be configured to engage the turbine vane axially between a first spring mount of the plurality of mounts and a second spring mount of the plurality of mounts.

In some embodiments, the vane mount may include a pair of mount hangers and a vane support. The pair of mount hangers may extend radially inward from the case toward the flow path ring. The vane support may have a carrier and a support spar. The carrier may be formed with a pair of carrier hooks. The carrier hooks may extend radially outward toward the case and mate with the pair of mount hangers to couple the carrier to the case. The support spar may extend radially inward from the carrier through the flow path ring and into the turbine vane.

In some embodiments, the turbine section may further comprise a seal. The seal may be located at an interface between the turbine vane and the flow path ring to seal therebetween. A forward end of the flow path ring may be located axially forward of the turbine vane. The forward end of the flow path ring may be located adjacent to a combustor liner included in the gas turbine engine.

These and other features of the present disclosure will become more apparent from the following description of the illustrative embodiments.

DETAILED DESCRIPTION OF THE DRAWINGS

Figure 1:
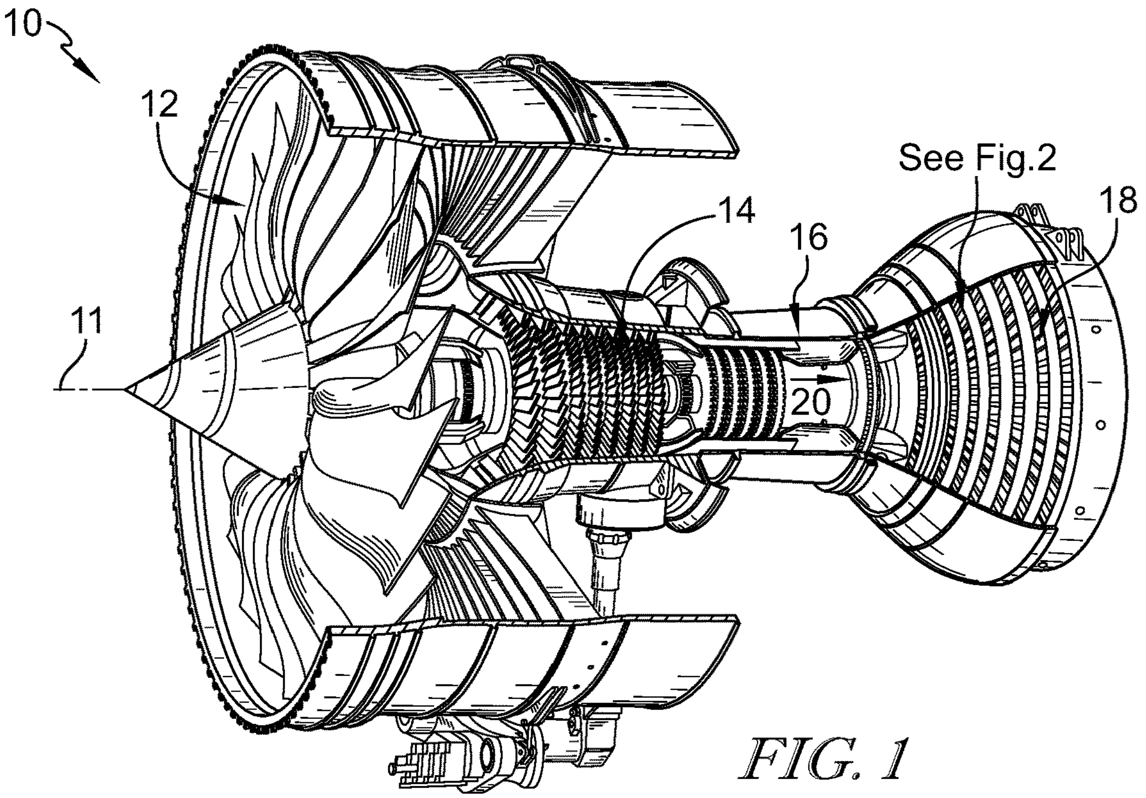
FIG. 1 is a cutaway perspective view of a gas turbine engine that includes a fan, a compressor, a combustor, and a turbine, the turbine including a turbine section comprising a case that extends circumferentially around a central axis of the gas turbine engine and a plurality of flow path components that define a primary gas path of the turbine section, such as static turbine vanes and rotating turbine blades downstream of the turbine vanes.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan 12 may be replaced with a propeller, drive shaft, or other suitable configuration.

Figure 2:
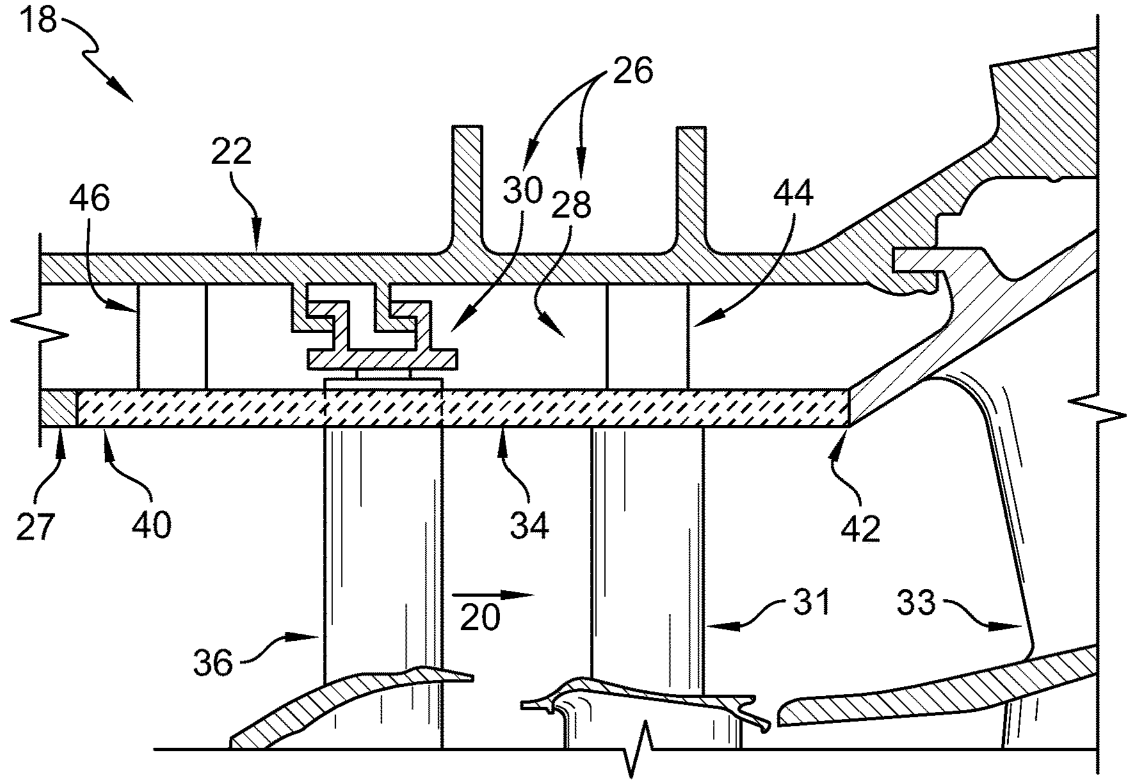
FIG. 2 is a cross-sectional view of a portion of the turbine section included in the gas turbine engine of FIG. 1 showing the plurality of flow path components further includes a flow path ring made of ceramic matrix composite materials that extends circumferentially about the central axis and axially between a forward end located axially forward of the turbine vanes and an aft end located axially aft of the turbine blades, and further showing the turbine section further includes a mounting system configured to couple the flow path ring to the case of the turbine section to support the flow path ring radially relative to the central axis of the gas turbine engine.
Figure 3:
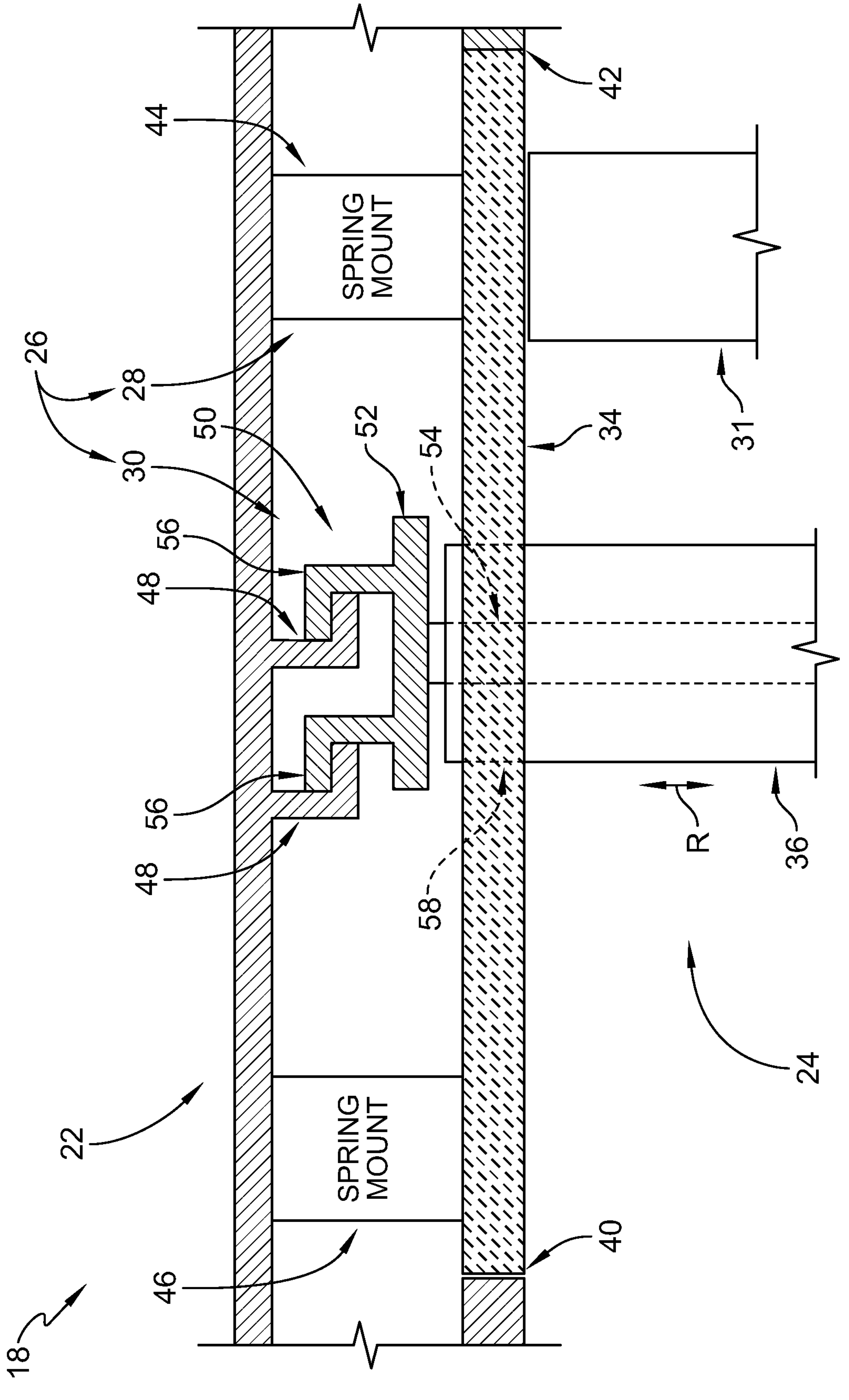
FIG. 3 is a detailed view of the turbine section of FIG. 2 showing that the mounting system includes a plurality of mounts arranged to extend between the flow path ring and the case and configured to elastically deform to maintain a radial position of the flow path ring relative to the case, and further showing that the turbine vane and the flow path ring are free for radial movement relative to each other to accommodate different rates of thermal expansion experienced by the ceramic matrix composite materials of the flow path ring and the metallic materials of the case.

The turbine 18 includes a case 22, a plurality of flow path components 24, and a mounting system 26 as shown in FIGS. 2 and 3. The case 22 is made of metallic materials and extends circumferentially around the central axis 11 of the gas turbine engine 10. The plurality of flow path components 24 are arranged to define a primary gas path 20 of the turbine 18 as shown in FIG. 2.

Figure 4:
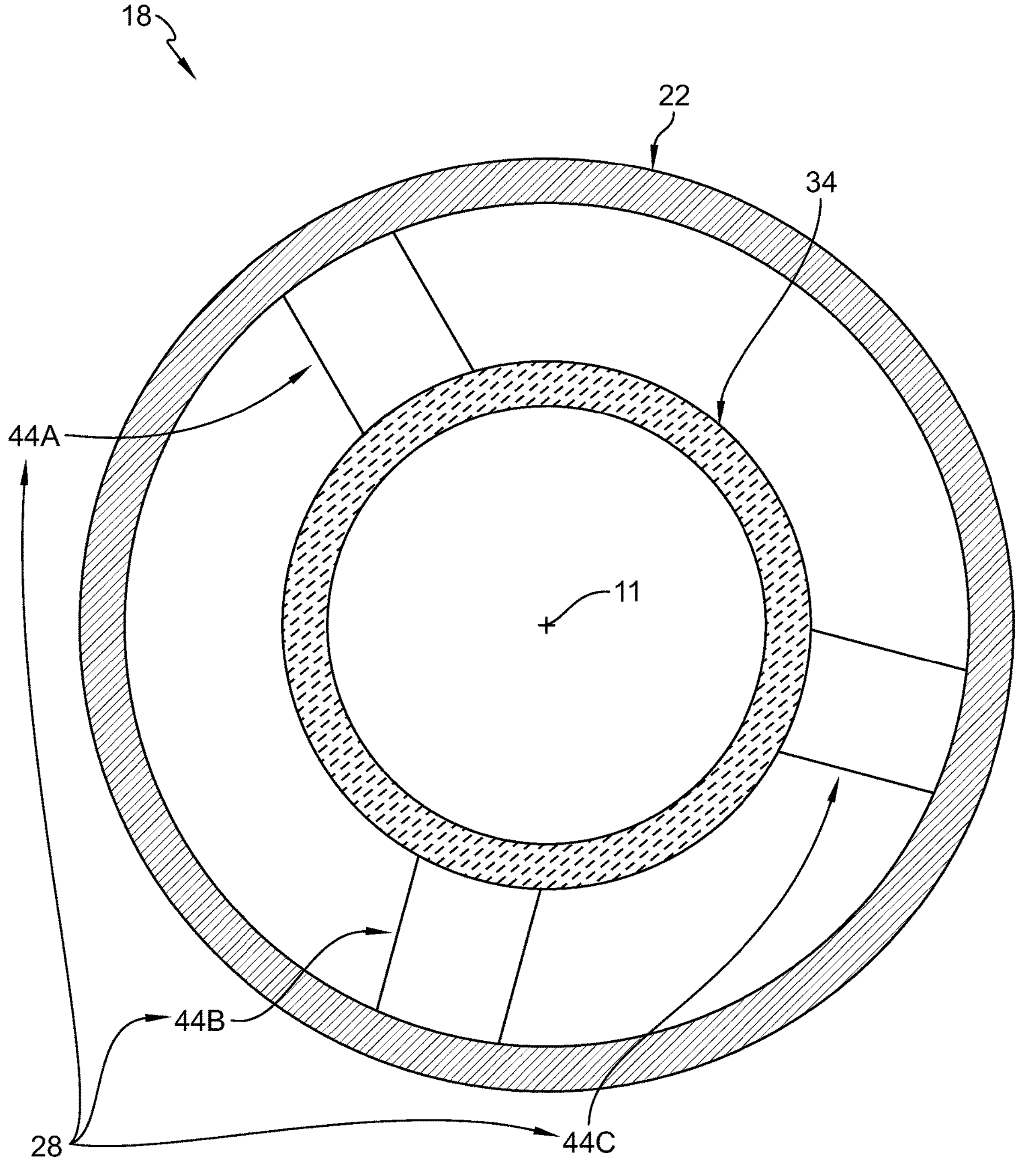
FIG. 4 is a circumferential cross-section of turbine section of the gas turbine engine of FIG. 1 looking axially aft along the central axis of the gas turbine engine showing that the case and the flow path ring extend circumferentially around the central axis of the gas turbine engine and the plurality of mounts are spaced apart circumferentially about the central axis of the gas turbine engine.

In the illustrative embodiment, the plurality of flow path components 24 include static turbine vanes 36, rotating turbine blades 31 located downstream of the turbine vanes 36, and a flow path ring 34 made of ceramic matrix composite materials. The turbine blades 31 are configured to rotate about the central axis 11 of the gas turbine engine 10. The flow path ring 34 extends circumferentially about the central axis 11 of the gas turbine engine 10 to define an outer boundary of the primary gas path 20 of the gas turbine engine 10. The flow path ring 34 also extends axially between a forward end 40 located axially forward of the turbine vane 36 and an aft end 42 located axially aft of the turbine blades 31. The mounting system 26 is configured to couple the flow path ring 34 to the case 22 to support the flow path ring 34 radially relative to the axis 11 of the gas turbine engine 10 as shown in FIG. 4.

The mounting system 26 includes a plurality of mounts 28 as shown in FIGS. 2 and 3. The plurality of mounts 28 are arranged to extend between the flow path ring 34 and the case 22. The mounts 28 are spring mounts in the illustrative embodiment that are configured to elastically deform. Additionally, the turbine vane 36 and the flow path ring 34 are free for radial movement R relative to each other to accommodate different rates of thermal expansion experienced by the ceramic matrix composite materials of the flow path ring 34 and the metallic materials of the case 22 as suggested in FIG. 3.

In the illustrative embodiment, the flow path ring 34 of the plurality of flow path components 24 comprises ceramic matrix composite materials, while the case 22 comprises metallic materials. Ceramic matrix composite materials can generally withstand higher temperatures than metallic materials. Therefore, incorporating ceramic matrix composite materials into the flow path ring 34 may allow for increased temperatures within the turbine 18 as well as decreased cooling air usage such that the overall efficiency of the gas turbine engine 10 can be improved. Moreover, integrating end walls of the turbine vanes 36 and the turbine shroud into an integral, single piece component like the flow path ring 34 may reduce leakage paths along the primary gas path 20.

However, the ceramic matrix composite materials of the flow path ring 34 and the metallic materials of the case 22 grow and shrink at different rates when exposed to high and low temperatures due to the differing coefficients of thermal expansion of the materials. Therefore, coupling the flow path components 24 to the case 22 may be challenging.

The plurality of spring mounts 28 extend between the flow path ring 34 and the case 22 to position the flow path ring 34 in the gas turbine engine 10. The spring mounts 28 may elastically deform to maintain the radial position of the flow path ring 34 relative to the case 22 as the metallic materials of the case 22 grow and shrink at different rates compared to the ceramic matrix composite materials of the flow path ring 34. The flow path ring 34 and the turbine vane 36 are free for radial movement R relative to each other as suggested in FIG. 3 to accommodate the differing rates of thermal expansion experienced by the ceramic matrix composite materials of the flow path ring 34 and the metallic materials of the case 22.

In other words, the flow path ring 34 and the turbine vane 36 are able to slide relative to each other as indicated by arrow R. The turbine vane 36 may be mounted to allow for movement through an airfoil aperture in the flow path ring 34 to accommodate thermal growth of components associated with the turbine 18 during use in the gas turbine engine 10.

In the illustrative embodiment, the plurality of spring mounts 28 of the mounting system 26 extend between and interconnect the case 22 and the flow path ring 34 as shown in FIGS. 3 and 4. The plurality of spring mounts 28 are spaced apart axially between the forward end 40 and the aft end 42 of the flow path ring 34 as shown in FIG. 3. The plurality of spring mounts 28 are also spaced apart circumferentially about the central axis 11 of the gas turbine engine 10 as shown in FIG. 4.

The plurality of spring mounts 28 includes a first spring mount 46 and a second spring mount 44 as shown in FIG. 3. The turbine vane 36 and the vane mount 30 are located axially between the first spring mount 46 and the second spring mount 44. The first spring mount 46 is located near the forward end 40 of the flow path ring 34 and the second spring mount 44 is located near the aft end 42 of the flow path ring 34. The plurality of spring mounts 28 may be evenly spaced apart axially or may be unevenly spaced apart axially.

The plurality of spring mounts 28 further includes a first spring mount 44A, a second spring mount 44B, and a third spring mount 44C as shown in FIG. 4. The spring mounts 44A-C may be evenly spaced apart circumferentially about the central axis 11, as suggested in FIG. 4, or may be unevenly spaced apart circumferentially about the central axis 11. The plurality of spring mounts 28 may include any number of spring mounts.

Turning again to the mounting system 26, the mounting system 26 includes the plurality of spring mounts 28 and a vane mount 30 as shown in FIGS. 2 and 3. The plurality of spring mounts 28 are arranged to extend between the flow path ring 34 and the case 22 and are configured to elastically deform. The vane mount 30 is configured to support the turbine vane 36.

The vane mount 30 of the mounting system 26 includes a pair of mount hangers 48 and a vane support 50 as shown in FIG. 3. The pair of mount hangers 48 extend radially inward from the case 22 toward the flow path ring 34. The vane support 50 couples the turbine vane 36 to the pair of mount hangers 48, and thus, the case 22.

The pair of mount hangers 48 are L-shaped hangers as shown in FIGS. 2 and 3. Each hanger 48 in the pair of mount hangers 48 extends radially inward from the case 22 and axially aft to form the L-shape of the hanger 48.

The vane support 50 of the vane mount 30 includes a carrier 52 and a support spar 54 as shown in FIG. 3. The carrier 52 is formed with a pair of carrier hooks 56 that mate with the pair of mount hangers 48. The support spar 54 extends radially inward from the carrier 52.

The carrier 52 is located radially outward of the turbine vane 36 and couples to the pair of mount hangers 48. The pair of carrier hooks 56 extend radially outward from the carrier 52 toward the case 22. The support spar 54 extends radially inward from the carrier 52 through the flow path ring 34 and into the turbine vane 36.

In the illustrative embodiment, the turbine vane 36 and the turbine blade 31 may be made of ceramic matrix composite materials. In illustrative embodiments, the turbine vane 36 is a hollow shell and the support spar 54 extends through the hollow shell. The turbine vane 36 may transfer some aerodynamic loads to the support spar 54 of the vane support 50 in the illustrative embodiment.

In the illustrative embodiment, the turbine vane 36, also referred to as the heat shield, is a separate component from the flow path ring 34. The turbine vane 36 extends through the flow path ring 34. The flow path ring 34 and the turbine vane 36 are free for radial movement R relative to each other to accommodate differing coefficients in thermal expansion between the metallic materials of the mounting system 26 and the case 22 and the ceramic matrix composite materials of the flow path ring 34.

The pair of carrier hooks 56 mate with the pair of mount hangers 48 to couple the vane support 50 to the case 22. Each hook 56 of the pair of carrier hooks 56 extends radially outward and axially forward to form the L-shape of the hook 56 that mates with each of the L-shaped hanger of the pair of mount hangers 48.

Each L-shaped hook of the pair of carrier hooks 56 is an upside-down L (e.g., an L shape that has been turned 180 degrees). Each L-shaped hanger of the pair of mount hangers 48 mates with the corresponding upside-down L-shaped hook of the pair of carrier hooks 56 of the vane support 50. This engagement allows for differences in thermal growth due to the different coefficients of thermal expansion of the metallic materials of the mounting system 26 and the case 22 and the ceramic matrix composite materials of the flow path ring 34.

In the illustrative embodiments, the turbine 18 further includes a seal 58 located between the turbine vane 36 and the flow path ring 34 as suggested in FIG. 3. The seal 58 is coupled to the flow path ring 34 for movement therewith. The seal 58 is located at an interface between the turbine vane 36 and the flow path ring 34 to seal therebetween.

In the illustrative embodiment, the combustor 16 of the gas turbine engine 10 includes a combustor liner 27. One end of the combustor liner 27 is located adjacent to the forward end 40 of the flow path ring 34. The combustor liner 27 is radially aligned with the flow path ring 34.

In the illustrative embodiment, the forward turbine vane 36 may provide axial fixity of the flow path ring 34. In other words, the forward turbine vane 36 may block axial movement of the flow path ring 34 relative to other components of the gas turbine engine 10. In some embodiments, the aft turbine vane 33 may provide axial fixity for the flow path ring 34.

In the illustrative embodiments, the case 22 is a single, integral piece. In some embodiments, the case 22 may comprise multiple sections that are fastened together to form the case 22. For example, the case 22 may comprise a first section forming a combustor case and a second section forming a HP-IP turbine case. Alternatively, the case 22 may comprise a first section forming a combustor-HP case and a second section forming an IP turbine case. The different parts of the mounting system 26 may extend between different sections of the case 22 if the case 22 is formed from multiple pieces fastened together.

A method of assembling the turbine 18 may include several steps. The method may begin with assembling the turbine vane 36 and the vane support 50 with the flow path ring 34. Next, the assembled components are arranged within the case 22. The assembled components are arranged so that the pair of mount hangers 48 engage the pair of carrier hooks 56 of the vane support 50 and the plurality of spring mounts 28 engage the case 22 and the flow path ring 34. In other words, each L-shaped hanger 48 of the pair of mount hangers 48 mates with the corresponding L-shaped hook of the pair of carrier hooks 56.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine section for use with a gas turbine engine, the turbine section comprising:

a case made of metallic materials that extends circumferentially around a central axis of the gas turbine engine, a plurality of flow path components arranged to define a primary gas path of the turbine section, the plurality of flow path components including a turbine vane, a turbine blade located axially aft of the turbine vane and configured to rotate about the central axis of the gas turbine engine, and a flow path ring made of ceramic matrix composite materials that extends circumferentially all the way around the central axis of the gas turbine engine to define an outer boundary of the primary gas path of the gas turbine engine and extends axially between a forward end located axially forward of the turbine vane and an aft end spaced apart axially from the forward end and located axially aft of the turbine blade, and a mounting system configured to couple the flow path ring to the case to support the flow path ring radially relative to the central axis of the gas turbine engine, the mounting system including a plurality of spring mounts and a vane mount, the plurality of spring mounts arranged to extend between the flow path ring and the case and configured to elastically deform, wherein the turbine vane extends radially through an aperture formed in the flow path ring and the turbine vane and the flow path ring are free for radial movement relative to each other to accommodate different rates of thermal expansion experienced by the ceramic matrix composite materials of the flow path ring and the metallic materials of the case, wherein the plurality of spring mounts are spaced apart axially between the forward end of the flow path ring and the aft end of the flow path ring and the plurality of spring mounts are spaced apart circumferentially about the central axis of the gas turbine engine, wherein the plurality of spring mounts includes a first spring mount located near the forward end of the flow path ring and a second spring mount axially spaced apart from the first spring mount and located near the aft end of the flow path ring, and wherein the vane mount includes a pair of mount hangers extending radially inward from the case toward the flow path ring at a location axially between the first spring mount and the second spring mount and a vane support having a carrier located radially outward of the flow path ring and formed with a pair of carrier hooks that extend radially outward toward the case and mate with the pair of mount hangers to couple the carrier to the case and a support spar that extends radially inward from the carrier through the flow path ring and into the turbine vane.

2. The turbine section of claim 1, further comprising a seal coupled to the flow path ring for movement therewith and located at an interface between the turbine vane and the flow path ring to seal therebetween.

3. The turbine section of claim 1, wherein the turbine vane is axially located between the first spring mount and the second spring mount.

4. The turbine section of claim 1, wherein the vane mount is configured to engage the turbine vane axially between the first spring mount and the second spring mount.

5. The turbine section of claim 1, further comprising a seal located at an interface between the turbine vane and the flow path ring to seal therebetween.

6. The turbine section of claim 1, wherein the forward end of the flow path ring is located adjacent to a combustor liner included in the gas turbine engine.

7. The turbine section of claim 1, wherein the turbine vane is configured to block axial movement of the flow path ring relative to other components of the gas turbine engine.

8. A turbine section for use with a gas turbine engine, the turbine section comprising:

a case made of metallic materials that extends circumferentially around a central axis of the gas turbine engine, a plurality of flow path components including a turbine vane, a turbine blade located axially aft of the turbine vane and configured to rotate about the central axis of the gas turbine engine, and a flow path ring made of ceramic matrix composite materials that extends circumferentially all the way around the central axis of the gas turbine engine to define an outer boundary of the primary gas path of the gas turbine engine and extends axially between the turbine vane and the turbine blade, and a mounting system configured to couple the flow path ring to the case to support the flow path ring radially relative to the central axis of the gas turbine engine, the mounting system including a plurality of mounts arranged to extend between the flow path ring and the case and configured to elastically deform to maintain a radial position of the flow path ring relative to the case, wherein the turbine vane extends radially through the flow path ring, wherein the turbine vane and the flow path ring are free for radial movement relative to each other to accommodate different rates of thermal expansion experienced by the ceramic matrix composite materials of the flow path ring and the metallic materials of the case, wherein the plurality of mounts are spring mounts and the plurality of mounts are spaced apart axially between a forward end of the flow path ring and an aft end of the flow path ring spaced apart axially from the forward end, and wherein the plurality of mounts includes a first spring mount located near the forward end of the flow path ring and a second spring mount axially spaced apart from the first spring mount and located near the aft end of the flow path ring, and wherein the turbine vane is axially located between the first spring mount and the second spring mount.

9. The turbine section of claim 8, further comprising a seal coupled to the flow path ring for movement therewith and located at an interface between the turbine vane and the flow path ring to seal therebetween.

10. The turbine section of claim 8, wherein the plurality of mounts are spaced apart circumferentially about the central axis of the gas turbine engine.

11. The turbine section of claim 8, wherein the mounting system further includes a vane mount located configured to engage the turbine vane axially between the first spring mount of the plurality of mounts and the second spring mount of the plurality of mounts.

12. The turbine section of claim 11, wherein the vane mount includes a pair of mount hangers extending radially inward from the case toward the flow path ring at a location axially between the first spring mount and the second spring mount and a vane support having a carrier formed with a pair of carrier hooks that extend radially outward toward the case and mate with the pair of mount hangers to couple the carrier to the case and a support spar that extends radially inward from the carrier through the flow path ring and into the turbine vane.

13. The turbine section of claim 12, further comprising a seal located at an interface between the turbine vane and the flow path ring to seal therebetween.

14. The turbine section of claim 8, wherein a forward end of the flow path ring located axially forward of the turbine vane is located adjacent to a combustor liner included in the gas turbine engine.

15. A turbine section for use with a gas turbine engine, the turbine section comprising:

a case made of metallic materials that extends circumferentially around a central axis of the gas turbine engine, a plurality of flow path components arranged to define a primary gas path of the turbine section and exposed to gases in the primary gas path of the turbine section, the plurality of flow path components including a turbine vane, a turbine blade spaced apart axially from the turbine vane and configured to rotate about the central axis of the gas turbine engine, and a flow path ring made of ceramic matrix composite materials that extends circumferentially around the central axis of the gas turbine engine to define an outer boundary of the primary gas path of the gas turbine engine and extends axially between a forward end located axially forward of the turbine vane and an aft end spaced apart axially from the forward end and located axially aft of the turbine blade, and a mounting system configured to couple the flow path ring to the case to support the flow path ring radially relative to the central axis of the gas turbine engine, the mounting system including a plurality of mounts arranged to extend between the flow path ring and the case and configured to elastically deform, wherein the turbine vane extends radially through an aperture formed in the flow path ring and the turbine vane and the flow path ring are free for radial movement relative to each other to accommodate different rates of thermal expansion experienced by the ceramic matrix composite materials of the flow path ring and the metallic materials of the case, and wherein the mounting system further includes a vane mount located axially between a first mount included in the plurality of mounts and a second mount included in the plurality of mounts spaced apart axially from the first mount and the vane mount is configured to engage the turbine vane to support the turbine vane.

16. The turbine section of claim 15, wherein the vane mount includes a pair of mount hangers and a vane support, the pair of mount hangers each extend radially inward from the case toward the flow path ring at a location axially between the first mount and the second mount, and the vane support includes a carrier located radially outward of the flow path ring and formed with a pair of carrier hooks that extend radially outward toward the case and mate with the pair of mount hangers to couple the carrier to the case and a support spar that extends radially inward from the carrier through the flow path ring and into the turbine vane.

* * * * *